US005392641A

United States Patent [19]

McCombie

[11] Patent Number: 5,392,641

[45] Date of Patent: Feb. 28, 1995

[54] IONIZATION MISFIRE DETECTION APPARATUS AND METHOD FOR AN INTERNAL COMBUSTION ENGINE

[75] Inventor: Jay C. McCombie, Rochester Hills, Mich.

[73] Assignee: Chrysler Corporation, Highland Park, Mich.

[21] Appl. No.: 28,106

[22] Filed: Mar. 8, 1993

[51] Int. Cl.⁶ ............ G01M 15/00

[52] U.S. Cl. ............ 73/117.3

[58] Field of Search ............ 73/116, 118.1, 117.3; 324/399, 459

[56] References Cited

U.S. PATENT DOCUMENTS

| | | | |
|---|---|---|---|
| 3,908,366 | 12/1975 | Masaki | 60/277 |
| 4,186,701 | 2/1980 | Suzuki et al. | |
| 4,271,811 | 6/1981 | Suzuki et al. | 123/571 |
| 4,308,519 | 12/1981 | Garcea et al. | 340/53 |
| 4,488,528 | 12/1984 | Morikawa | 123/425 |
| 4,491,110 | 1/1985 | Bone et al. | 123/425 |
| 4,716,874 | 1/1988 | Hilliard et al. | 123/425 |
| 4,846,129 | 7/1989 | Noble | 123/425 |
| 4,862,093 | 8/1989 | Jiewertz | 324/464 |
| 4,886,029 | 12/1989 | Lill et al. | 123/479 |
| 4,928,228 | 5/1990 | Fujimoto et al. | 364/431.09 |
| 4,930,481 | 5/1990 | Fujimoto et al. | 123/481 |
| 4,987,711 | 1/1991 | Iwata | 73/117.3 |
| 4,987,771 | 1/1991 | Iwata | 73/117.3 |
| 5,045,796 | 9/1991 | Bentel et al. | 324/399 |
| 5,144,927 | 9/1992 | Denz | 123/425 |

OTHER PUBLICATIONS

Publication, "Vehicular Technology", IEEE Vehicular Technology Society vol. VT-27 No.1, Feb. 1978.

*Primary Examiner*—Robert Raevis
*Attorney, Agent, or Firm*—Mark P. Calcaterra

[57] ABSTRACT

A misfire detection apparatus and method is provided for detecting misfire in cylinders of an internal combustion engine in a motor vehicle. The method includes sensing ionization current through spark plugs in either a distributorless ignition system or a distributor ignition system. The method also includes disabling ionization current sensing during ignition coil discharge time. The method further includes making and storing the combustion ionization measurements in order to determine if a misfire has occurred and if catalyst damage has occurred due to the misfire.

15 Claims, 10 Drawing Sheets

IONIZATION MISFIRE DETECTION APPARATUS AND METHOD FOR AN INTERNAL COMBUSTION ENGINE

BACKGROUND OF THE INVENTION

1. Field of the Invention

The present invention relates generally to internal combustion engines and, more particularly, to a misfire detection apparatus and method for an internal combustion engine.

2. Description of the Related Art

The Clean Air Act (1955) required motor vehicle manufacturers to reduce exhaust emissions of carbon monoxide, hydrocarbons, and oxides of nitrogen from light-duty motor vehicles. To comply with the Act, most motor vehicle manufacturers have used catalytic convertors on production motor vehicles to control such exhaust emissions.

Recently, regulatory agencies have proposed that passenger, light-duty and medium-duty motor vehicles with feedback fuel control systems be equipped with a malfunction indicator light that will inform the motor vehicle operator of any malfunction of an emission-related component that interfaces with an on-board computer of the motor vehicle. It is also proposed or required that an on-board diagnostic system identify the likely area of malfunction. Proposals or requirements have set forth catalyst, misfire, evaporative purge system, secondary air system, air conditioning system, fuel system, oxygen sensor, exhaust gas recirculation, and comprehensive component monitoring requirements.

Misfire of internal combustion engines can damage the catalyst of a catalytic convertor. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an Inspection and Maintenance (IM) program tailpipe exhaust emission test.

SUMMARY OF THE INVENTION

It is, therefore, one object of the present invention to provide an apparatus and method of misfire detection for an internal combustion engine.

It is another object of the present invention to use an ionization circuit for misfire detection.

It is yet another object of the present invention to provide a method of misfire detection based on whether an ionization current is received to determine whether a misfire has occurred.

To achieve the foregoing objects, the present invention is a misfire detection apparatus and method for detecting misfire in cylinders of an internal combustion engine in a motor vehicle. The method includes sensing ionization current through spark plugs in either a distributorless ignition system or a distributor ignition system. The method also includes disabling ionization current sensing during ignition coil discharge time. The method further includes making and storing the combustion ionization measurements in order to determine if a misfire has occurred and if catalyst damage has occurred due to the misfire.

One advantage of the present invention is that an apparatus and method of misfire detection is provided for an internal combustion engine. Another advantage of the present invention is that an ionization circuit is used to measure the ionization of a particular cylinder in the measurement period. Yet another advantage of the present invention is that the method uses ionization current waveforms to determine misfire.

Other objects, features and advantages of the present invention will be readily appreciated as the same becomes better understood after reading the following description taken in conjunction with the accompanying drawings.

DESCRIPTION OF THE PREFERRED EMBODIMENT(S)

Figure 1:
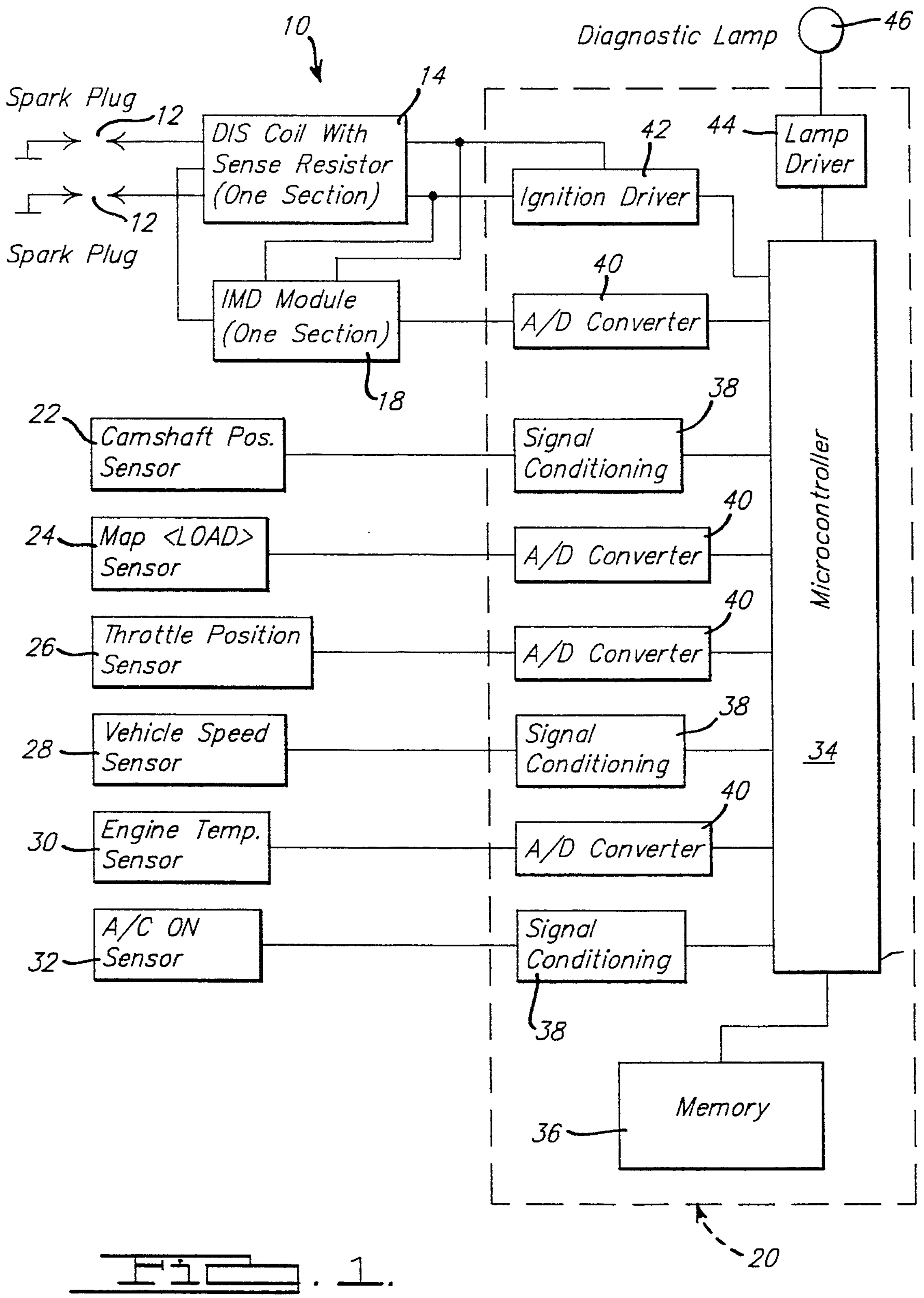
FIG. 1 is an overall block diagram illustrating the misfire detection apparatus according to the present invention.

Referring to FIG. 1, an ionization misfire detection apparatus 10, according to the present invention, is shown. The apparatus 10 is used on an internal combustion engine (not shown) of a motor vehicle (not shown). The internal combustion engine is conventional and includes a multiple of cylinders, pistons disposed in the cylinders, connecting rods interconnecting the pistons and a crankshaft, and a cam shaft for opening and closing valves of the cylinders. The engine also includes spark plugs 12 for the cylinders.

The spark plugs 12 are connected to a distributorless coil 14 which has a sense resistor 16 (FIG. 2) within it. The distributorless coil 14 is connected to an Ionization Misfire Detection (IMD) module 18. The IMD module 18 monitors a change in the ionization current from the spark plugs 12 which is an analog signal. The distributorless coil 14 and IMD module 18 are connected to a controller, generally indicated at 20, such as an electronic engine controller.

The apparatus 10 also includes a camshaft position sensor 22, a map or load sensor 24, a throttle position sensor 26, a vehicle speed sensor 28, an engine temperature sensor 30, and an air conditioner (A/C) sensor 32. The outputs of the sensors 22, 24, 26, 28, 30, 32 communicate with the controller 20. Although the preferred embodiment of the apparatus 10 is applied to a four stroke engine, the apparatus 10 also may be applied to other internal combustion engines, such as a two stroke engine. In addition, the apparatus 10 can be applied to any spark ignited engine.

The controller 20 includes a micro controller 34, memory 36, signal conditioning 38, Analog to Digital (A/D) converter 40, and an ignition driver 42 to take signals from the various sensors described above and process them according to the misfire detection methodology described below. In the preferred embodiment, the output of the camshaft position sensor 22, vehicle speed sensor 28 and A/C sensor 32 communicates with the micro controller 34, via appropriate signal conditioning 38, which is particularized to the type of sensor used. The output of the MAP sensor 24, throttle position sensor 26, engine temperature sensor 30, and IMD Module 18 communicates with the micro controller 34, via the A/D converters 40. The distributorless coil 14 is controlled by the micro controller 34, via the ignition driver 42. The controller 20 also includes a lamp driver 44, which takes the output of the micro controller 34 and drives an output display such as an indicator light or driver warning lamp 46. It should be appreciated that memory 36 refers to a generic memory and may comprise Random Access Memory (RAM), Read Only Memory (ROM), or another type as appropriate. It should also be appreciated that the controller 20 includes timers, counters and like components for the misfire detection methodology to be described.

Figure 2:
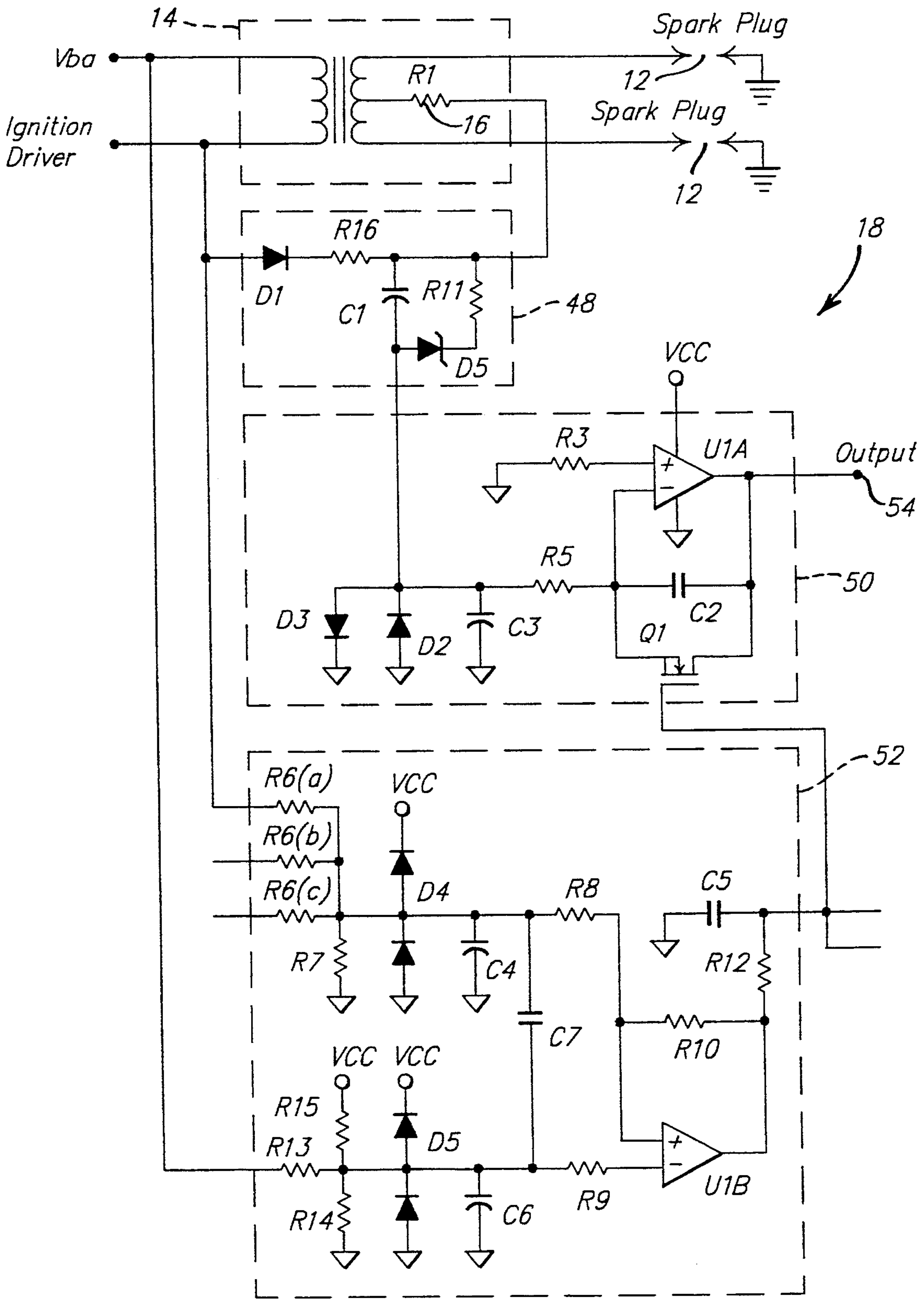
FIG. 2 is a circuit schematic of a portion of the misfire detection apparatus of FIG. 1.

Referring to FIG. 2, the IMD module 18 is shown. The IMD module 18 includes a current integrator circuit 50, a voltage source circuit 48, and an integrator reset circuit 52. The voltage source circuit 48 includes capacitor C1, resistor R11 and diodes D1, D5. During the first several microseconds of discharge by the distributorless coil 14, the capacitor C1 of the voltage source circuit 48 is charged through diodes, D1, D3 and resistor R16 from the primary winding of the coil 14. Also during this time, the resistor R11 and zener diode D5 are used to limit the voltage of capacitor C1 when the primary voltage is typically between 250 volts and 350 volts. After the spark plugs 12 have fired, the primary voltage drops and stays at an almost steady, typically 30 volts above the battery voltage (Vba), for approximately 0.8 to 1.5 milliseconds. The primary voltage will then drop down to the battery voltage (Vba) of approximately 14 volts after the coil 14 has been discharged.

The primary voltage is monitored by the integrator reset circuit 52. The integrator reset circuit 52 includes a comparator with hysteresis formed by an operational amplifier (op. amp.) U1B with resistors R8, R9, and R10. The resistors R6(*a*) through R6(*c*) and R7 along with capacitor C4 and dual diodes D4 form a voltage divider, noise filter and level limiter of the primary voltage on the ignition driver side. While resistors R13, R14 and R15, along with capacitor C6, and dual diode D5 form the voltage divider, noise filter and level limiter of the coil primary voltage on the battery side. The resistor R15 is used to determine the comparator threshold. .Meanwhile, the capacitor C7 is used to limit differential noise on the input of the comparator. As a result of this configuration, the integrator reset circuit 52 will produce a high level reset signal during the discharge of the coil 16. It should be appreciated that the reset signal may be used as a diagnostic if so required.

The reset signal from the integrator reset circuit 52 is applied to the gate of transistor Q1 in the current integrator circuit 50. The integrator reset circuit 52 also includes a resistor-capacitor network R12 and C5 which stretches the reset signal in order to avoid any false measurement during secondary ringing time after the arc breaks. After the reset signal passes through the resistor-capacitor network R12 and C5, the transistor Q1 begins to conduct, in turn, causing the reset of the current integrator circuit 50.

The current integrator circuit 50 includes a transistor Q1, an Op Amp U1A, resistor R3 and capacitor C2. The transistor Q1 is preferably a small signal N-channel MOSFET. The current integrator circuit 50 also include diodes D2 and D3 which cooperates with diode D1 of the voltage source circuit 48 to limit the voltage and provide a conductive current path for charging capacitor C1 of the voltage circuit source 48. The current integrator circuit 50 further includes capacitor C3 and resistor R5 which act as an extra filter of noise. After the coil 14 discharges, capacitor C1 serves as a 200 V source which causes an ionization current to flow through resistor R1 at the secondary winding of the coils 14 and the spark plugs 12. This ionization current also flows from the negative side of capacitor C1 into the current integrator circuit 50, causing its output 54 to rise as will be described.

Figure 4:
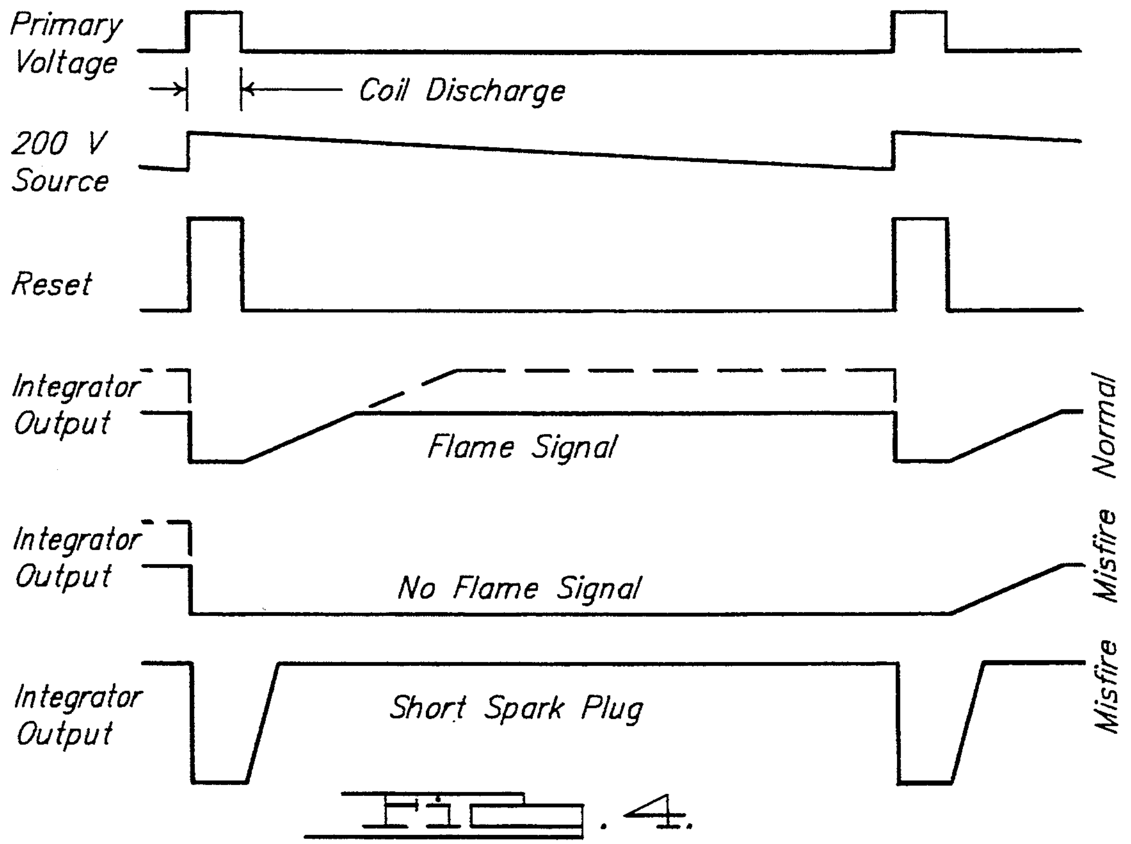
FIGS. 4 and 5 are graphs of waveforms for the misfire detection apparatus of FIGS. 1 through 3.

The current integrator circuit 50 has a time constant which is a predetermined value that causes the output 54 to be set between ground and voltage Vcc for normal operation of the engine. However, if there is no ionization current after reset, the output 54 of the current integrator 50 will remain low. If the spark plug 12 is found to be shorted, the output 54 of the current integrator circuit 50 will quickly return after reset to its voltage Vcc which for example equals 8 V. The waveforms for the current integrator circuit 50 are shown in FIG. 4.

Figure 3:
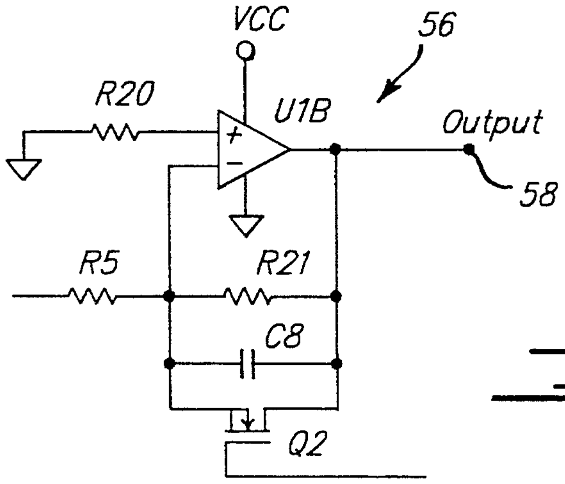
FIG. 3 is a circuit schematic of an alternate embodiment of the portion of the misfire detection apparatus of FIG. 2.

Referring to FIG. 3, a current to voltage converter circuit 56 may be used, instead of the current integrator circuit 50, for one pair of cylinders of a typical distributorless ignition system. This current to voltage converter circuit 56 includes an op. amp. U1B which is connected to voltage Vcc. The circuit 56 also includes resistors R20 and R21 and capacitor C8. The resistor R21 and capacitor C8 are connected in parallel with a transistor Q2. The transistor Q2 will short a signal across R21 and C8 and into the negative terminal of the op. amp., U1B. The transistor Q2 begins conducting when a high level reset signal from circuit 52 is applied to its gate. This high level signal will cause the reset of the current to voltage converter circuit 56. The capacitor C8 acts as a filter for the signal coming from resistor R5 to filter out any extra noise present in the signal. The current to voltage converter circuit 56 sensitivity is set such that the output signal 58 remains between ground and the voltage Vcc for normal operation similar to that in the current integrator circuit 50.

Figure 5:
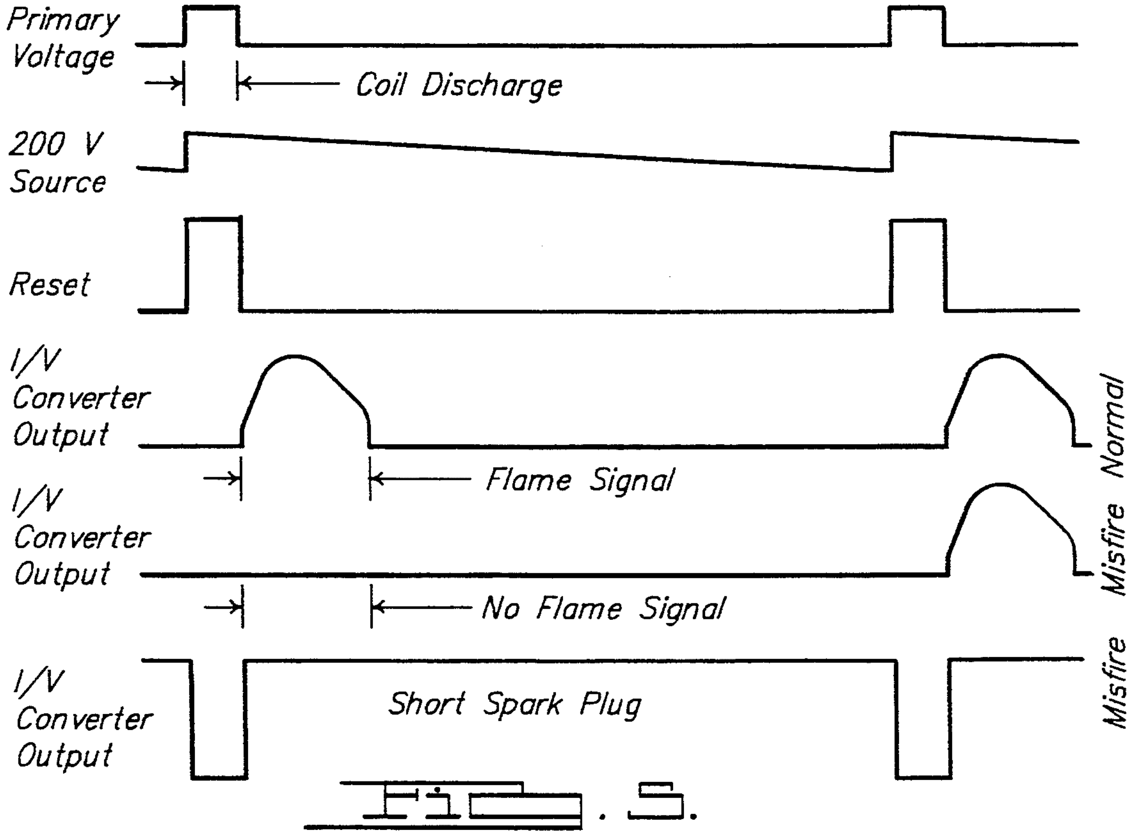

The current to voltage converter circuit 56 creates irregular output waveforms especially when the engine is at idle speed. During normal output, the current to voltage converter circuit 56 creates an output 58 which follows the ionization current as illustrated in FIG. 5. The ionization current quickly reaches at least one peak and then returns to ground all within the flame signal. If the ionization current is absent after reset of the circuit 56, the output 58 will remain low from the current to voltage converter 56. However, if the spark plug 12 is shorted, the output 58 of the current to voltage converter circuit 56 will rise to the value of the voltage Vcc shortly after reset.

The current integrator circuit 50 and the current to voltage converter circuit 56 can also be used in a typical distributor ignition system for a four cylinder engine or any other number of cylinders. The waveforms will be the same for both circuits. The only difference from the circuits for the distributorless system is that the ionization current will flow from capacitor C1 of the 200 V voltage source through a parallel resistor network R1*a* or R1*b* (not shown) and the spark plug 12. It should be appreciated that the parallel resistor network R1*a* and R1*b* replaces resistor R1 of FIG. 2.

Figure 6:
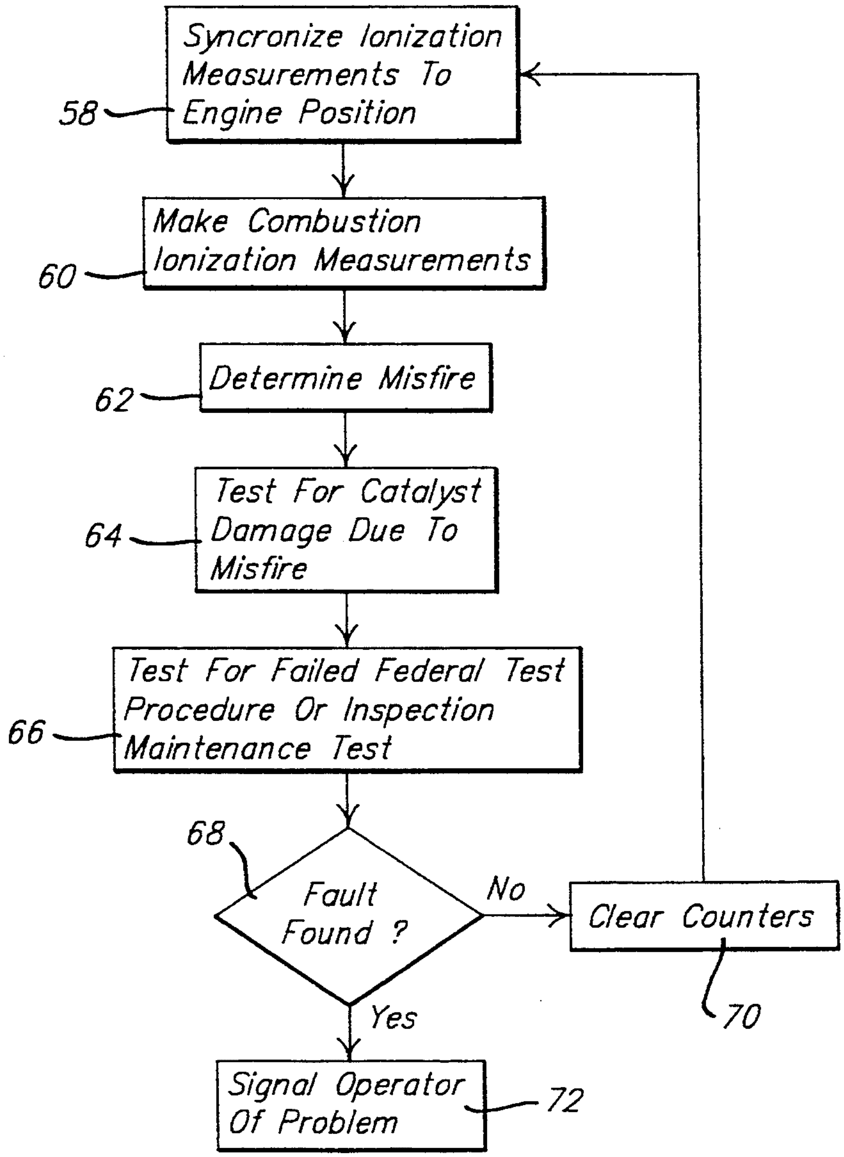
FIG. 6 is a flowchart of an overall method of misfire detection according to the present invention.

Referring to FIG. 6, an overall method of ionization misfire detection, according to the present invention, is illustrated. The methodology begins in block 58 and synchronizes ionization measurements to be performed according to cylinder position of the engine. The methodology then advances to block 60 and performs combustion ionization measurements with the apparatus 10. The methodology advances to block 64 and tests for catalyst damage due to misfire detected with the apparatus 10. Once this has occurred, the methodology advances to block 66 and tests for failed federal test procedure or inspection maintenance due to misfire detected. Next, the methodology advances to diamond 68 and determines whether a fault occurred due to the tests in blocks 64 and 66. If no fault has occurred or is found, the methodology advances to block 70 and clears misfire counters to be described. The methodology then returns to block 58 previously described. If a fault has occurred, the methodology advances to block 72 and signals the vehicle operator of a possible problem. Then methodology then ends.

Figure 7:
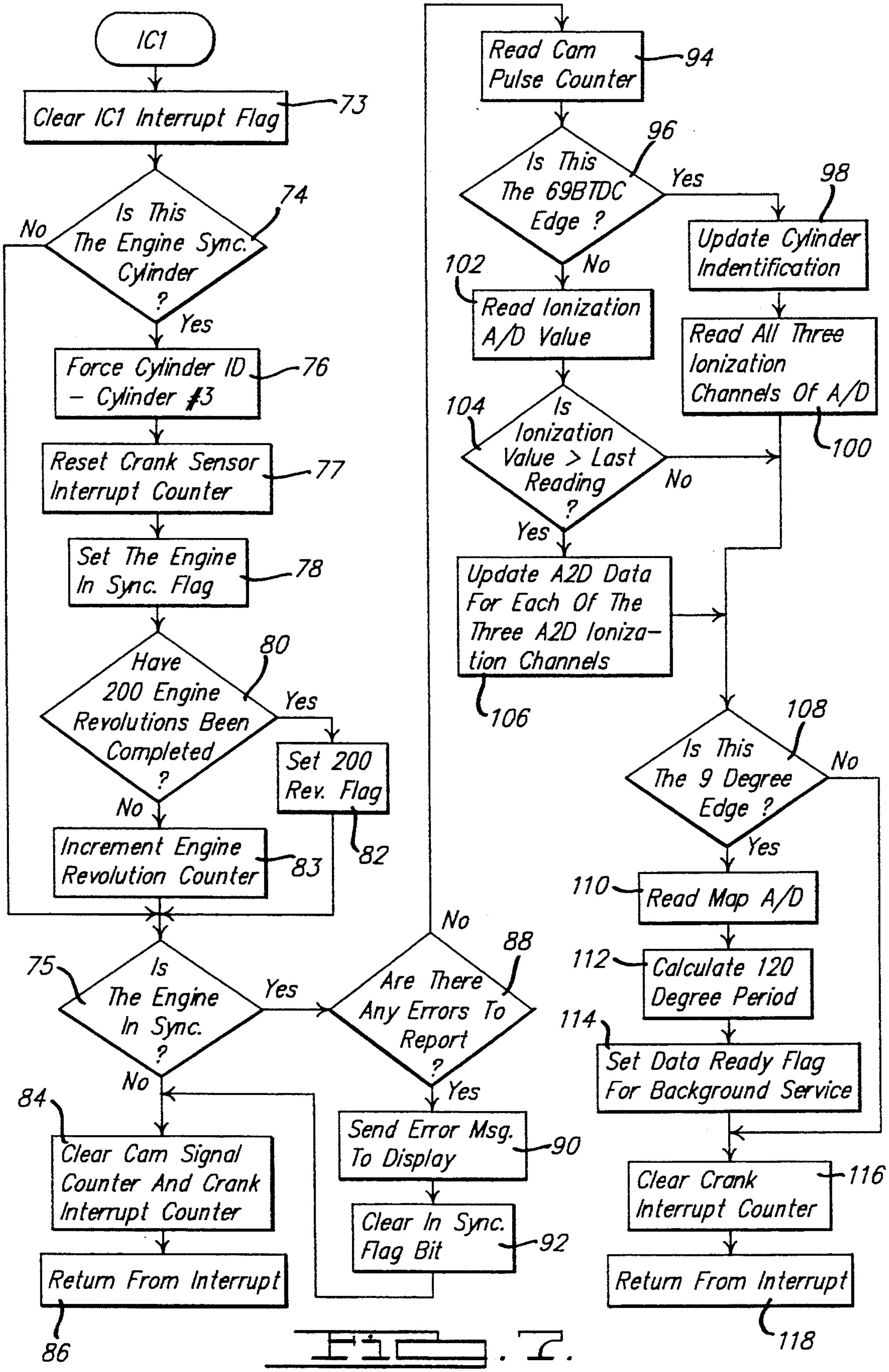
FIGS. 7 through 14 are flowcharts of a detailed method of misfire detection according to the present invention.

Referring to FIG. 7, a methodology for interfacing directly with cam shaft position sensors 22 for cylinder position of the engine and the current integrator circuit 50 is shown. The methodology begins in block 73 where micro controller 34 clears an IC1 interrupt flag 66. The methodology then enters decision block 74 and determines if the engine synchronous cylinder has been found. This is done by sampling the signal from the cam shaft position sensors 22. In decision block 74, if this is not the engine synchronous cylinder, the methodology falls through to decision block 75 to be described. However, if this is the engine synchronous cylinder, the methodology advances to block 76 and forces the cylinder ID to cylinder three (3). Next, the methodology advances to block 77 and resets a crank sensor interrupt counter to a predetermined value such as zero (0). This zero sets the crank interrupt at 69 degrees. The methodology then advances to block 78 where an engine in synchronous (INSYNC) flag is set to indicate the engine synchronization has been achieved. Then, the methodology advances to decision block 80 and determines if two hundred (200) engine revolutions have been completed by looking for a service flag. If 200 engine revolutions have been completed, the methodology advances to block 82 and sets a 200 revolution service flag. However, if 200 engine revolutions have not been completed, the methodology advances to block 83 and increments an engine revolution counter. The methodology then falls through to decision block 75.

In decision block 75, the methodology determines if the engine's synchronization is complete by looking for the INSYNC flag. If it is determined the engine synchronization is not complete, the methodology advances to block 84 where a cam signal counter and a crank interrupt counter are cleared, e.g., set to zero. The methodology then advances to block 86 and the interrupt service is ended and the methodology returns to its main routine in FIG. 8 to be described. However, if in decision block 75 it was determined that engine synchronization had occurred, the methodology enters decision block 88 and tests for any errors in the methodology so far. If an error is found, the methodology advances to block 90 and an error message is sent to user's display. The methodology then advances to block 92 where the INSYNC flag is cleared. Then, the methodology reenters blocks 84 and 86 previously described.

If no errors were detected in decision block 88, the methodology advances to block 94 and reads a cam pulse counter. Next, the methodology advances to decision block 96 and determines if a counter is equal to zero. If the counter is equal to zero, this indicates that a 69 degree BTDC edge and the methodology then passes to block 98 and updates the cylinder identification. In block 98, the memory location (CYLID) is incremented to current cylinder identification. Then the methodology advances to block 100 where all of the ionization integrator circuit outputs 54 are read for the three ionization channels of the analog to digital inputs of the microcontroller 34. The methodology then advances to decision block 108 to be described.

If decision block 96 does not equal zero, the methodology passes to block 102 and reads the analog to digital values of the current integrator circuit output 54. The methodology advances to blocks 104 and 106 where these values are compared with the last value read for each memory location. If the value is greater, the methodology advances to block 106 and the corresponding ionization channel is updated with the new value. The methodology then advances to decision block 108.

In decision block 108, the methodology tests for the last crank shaft interrupt that occurred at 9 degree BTDC. If this is the 9 degree service interrupt, the methodology advances to block 110 and reads the manifold absolute pressure (MAP) via the MAP sensor 24. The methodology then advance to block 112 and calculates the 120 degree period. This is calculated by taking the value of a free running timer of the micro controller 34 at the time the interrupt started and calculating this into a term, PERIOD, from which engine speed is calculated in the background loop of the micro controller 34. The methodology then advances to block 114 and sets the data ready flag for background service. This informs the main methodology that it is time to evaluate for misfire. If in decision block 108 it is found that this is not the 9 degree service interrupt or after block 114 the methodology advances to block 116 where a crank interrupt counter is cleared for the next routine. The methodology then advances to block 118 where the current interrupt routine service is terminated.

Figure 8:
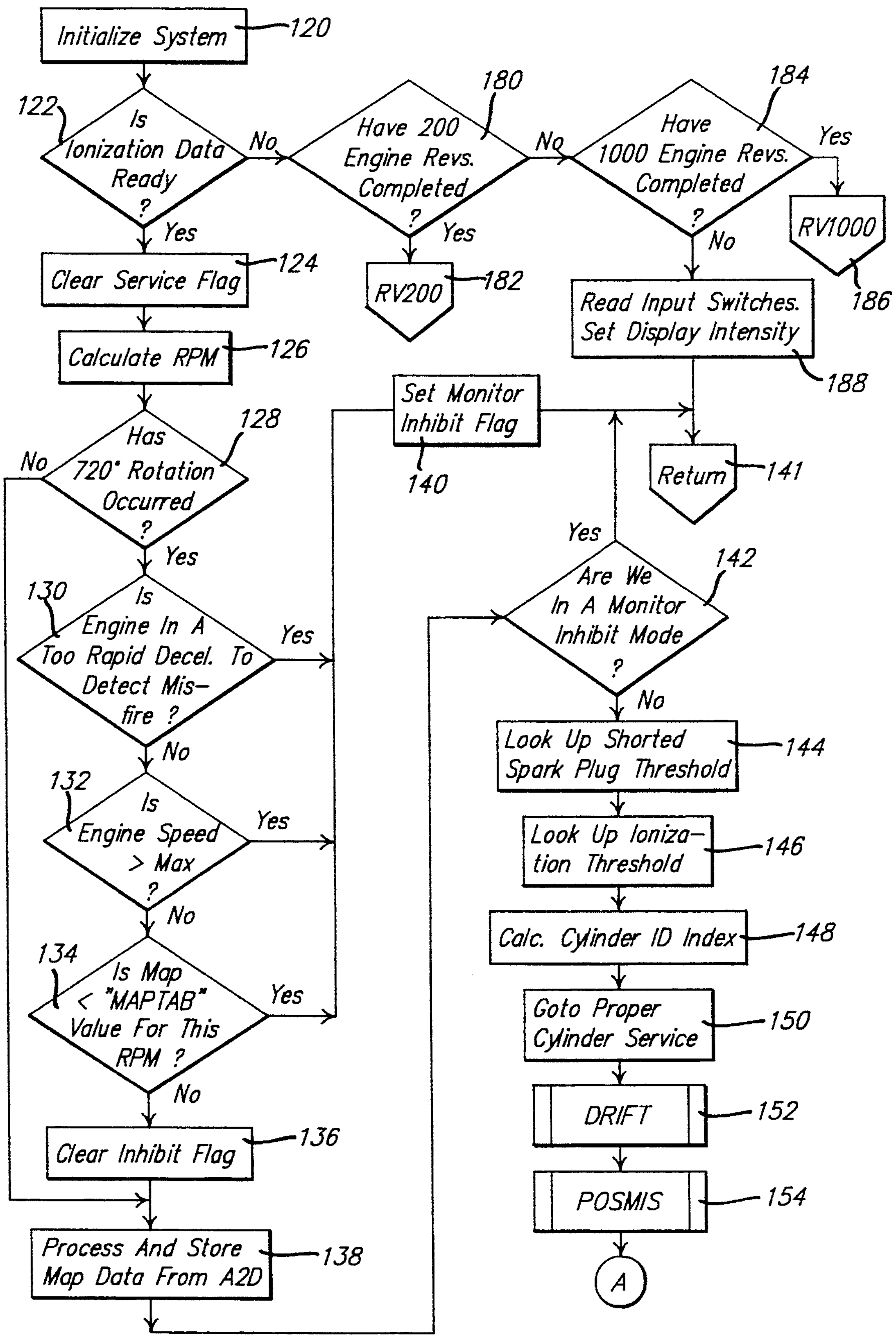

Referring to FIG. 8, the main routine or methodology for misfire detection according to the present invention is shown. The methodology begins in block 120 and will initialize all system inputs, outputs, messages, etc. The methodology then advances to decision block 122 and determines if the ionization data is ready. This is done by determining if the 9 degree interrupt has been completed by looking for the data ready flag. If ionization data is ready, the methodology advances to block 124 and clears the data ready service flag. The methodology then advances to block 126 and calculates engine RPM to one RPM resolution by using the PERIOD dated which was calculated in block 112 of FIG. 7. After calculating this engine RPM, the result is saved to memory. The methodology then advances to decision block 128.

In decision block 128, the methodology tests the engine for excessive engine rotational speed deceleration. This is accomplished by first testing if seven hundred twenty (720) degrees of engine rotation have occurred. If 720 degrees of engine rotation have not occurred, the test is not run and the methodology jumps to block 138 to be described. If 720 degrees of engine rotation have occurred, the methodology enters decision block 130 and determines if the engine is in too rapid a deceleration to detect a misfire. This is done by comparing the engine speed every 720 degrees to the old 720 degree data. If the rate of deceleration does exceed a predetermined rate, misfire detection will be inhibited by having the methodology pass to block 140 where a monitor inhibit flag is set. If the rate of deceleration is not too rapid to detect a misfire, the methodology will enter decision block 132 where the engine speed will be tested.

In decision block 132, the engine speed is compared with a predetermined maximum RPM allowable to enable detection of misfires. Anything above this maximum RPM value has an insufficient signal to noise ratio to determine misfire regardless of the engine load. This occurs because of the reduced ionization integration time which reduces the ionization integration voltage. If the engine speed is greater than this predetermined maximum value, the methodology will pass to block 140 previously described. However, if the engine speed is below the predetermined maximum value, the methodology will enter decision block 134. In decision block 134, the methodology determines if the MAP value is less than a MAPTAB value which is stored in memory for the particularly measured engine speed. This will determine if sufficient engine load exists to differentiate misfire at this particular engine speed. In decision block 134, if MAP is less than MAPTAB, the methodology will pass to block 140, previously described, because a sufficient load is not available for this engine speed. If MAP is not less than MAPTAB, the methodology will pass to block 136 where the monitor inhibit flag will be cleared. After leaving block 136, the methodology will enter block 138 where MAP is read, processed, and stored. This will determine the current load factor on the engine. This new MAP value will also be stored to the sensor value. The methodology then advances to decision block 142 to be described.

At block 140, the monitor inhibit flag is set and the current RPM calculation is saved to memory location RPMOLD. The methodology will also clear the RPM memory location. The methodology then returns through block 141.

In decision block 142, the methodology determines if the routine or methodology is in a monitor inhibit mode. This is done by testing the monitor inhibit flag to determine if it is set. If the monitor inhibit flag is set, the methodology returns via block 141. However, in decision block 142, if the methodology is not in a monitor inhibit mode, the methodology advances to block 144. In block 144, the cylinder independent table data,indexed by the present engine speed, is looked up. The shorted spark plug ionization threshold (SHRTRPM) is found first. Then, the methodology advances to block 146 and looks up the minimum ionization for combustion threshold stored in memory. The methodology next enters block 148 where the cylinder identification (CYLID) is read. This value is then used by the methodology to calculate a jump table index for the cylinder ID. The methodology then advances to block 150 where the proper cylinder service routine (CYLn) will be called, where "n" represents the present cylinder number. The methodology first executes the drift and POSMIS subroutines in blocks 152 and 154, respectively, before execution of the cylinder service routine.

Figure 11:
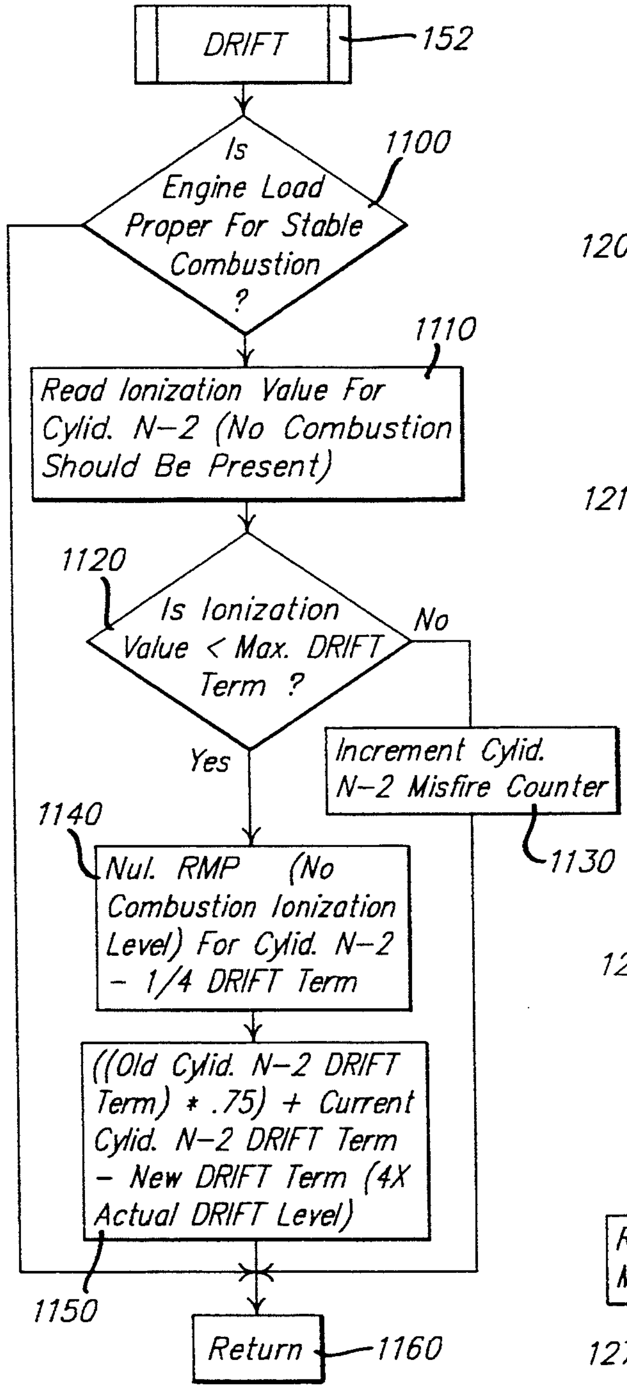

Referring to FIG. 11, the drift subroutine is shown. In decision block 1100, the methodology determines if the engine load is proper for stable combustion by referencing a MAP versus RPM table stored in memory. If so, the methodology advances to block 1110 and reads the ionization value for cylinder (n-2). The methodology then advances to decision block 1120 and if the ionization value is less than a maximum DRIFT term for a shorted spark plug on a predetermined cylinder. If not, the methodology advances to block 1130 and increments the misfire counter for that cylinder. The methodology advances to block 1160 and returns. If the ionization value is less than the maximum DRIFT term, the methodology advances to blocks 1140 and 1150 and calculates the ionization integrator value for a no-fire condition on the predetermined cylinder. The methodology will then calculate the DRIFT term by subtracting a predetermined reference number from the ionization integrator value for this particular cylinder. This will in turn compensate for any minor parallel d.c. current or circuit drifts. After block 1150, the methodology returns via block 1160.

Figure 12:
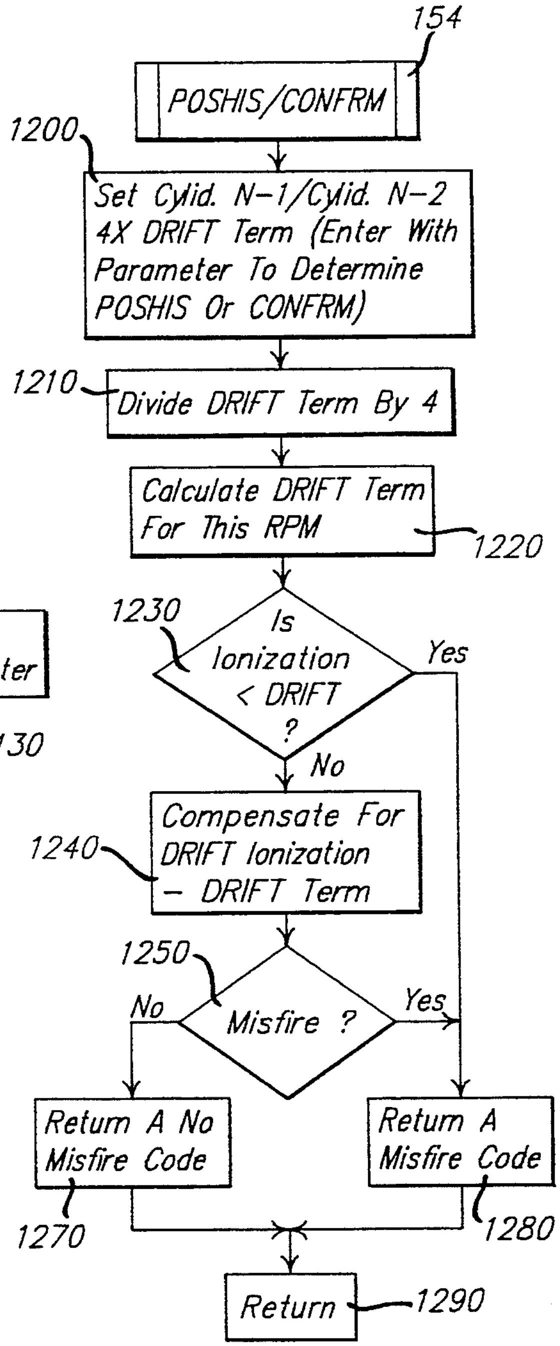

Referring to FIG. 12, the POSMIS/CONFRM subroutine begins in block 1200 . In block 1200, the methodology sets the (n-1) cylinder to four times the DRIFT term. The methodology advances to block 1210 and divides the DRIFT term by four. The methodology then advances to block 1220 and the DRIFT term is calculated for this particular engine RPM. The methodology next enters decision block 1230 and determines if the ionization value is less than the DRIFT term. If the ionization is less than DRIFT, the methodology enters block 1280 and returns a misfire code. The methodology then advances to block 1290 and returns.

In decision block 1230, if the ionization is not less than DRIFT, the methodology advances to block 1240 and compensates for the DRIFT ionization minus the DRIFT term. After such compensation, the methodology enters decision block 1250 and determines once again if a misfire has occurred. If a misfire is detected, the methodology will proceed through block 1280 as described earlier. If a misfire is not detected, the methodology will enter block 1270 and returns a no misfire code. The methodology then advances to block 1290 and returns. It should be appreciated that the POSMIS subroutine detects combustion within the first 120 degrees ATDC, while CONFRM which shares the subroutine will detect combustion in the 120 to 240 degree ATDC period if no combustion was detected earlier.

Figure 9:
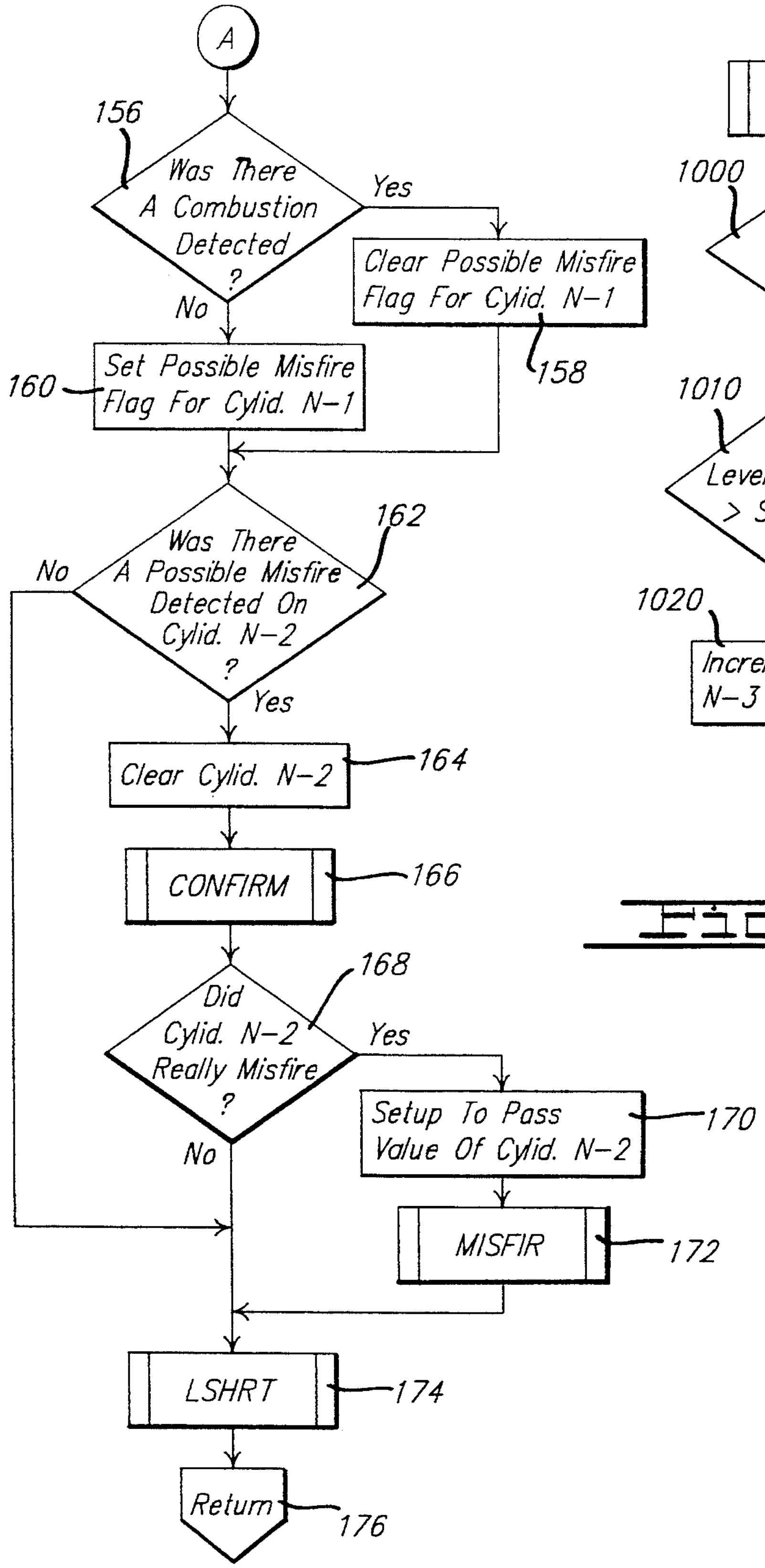

Referring to FIG. 9, the methodology returns to decision block 156 after executing DRIFT and POSMIS. In decision block 156, the methodology determines if a combustion was detected. This is done by examining the code from the POSMIS subroutine. If combustion was detected, the methodology enters-block 158 and clears the possible misfire flag for cylinder (n-1). However, if a combustion was not detected, the methodology advances to block 160 and sets the possible misfire flag for a cylinder (n-1). From blocks 158 and 160, the methodology advances to decision block 162.

In decision block 162, the methodology determines if there was a possible misfire detected on cylinder (n-2). This is done by testing to see if the flag for cylinder (n-2) is set. If a possible misfire was not detected, the methodology advances to block 174 to be described. If a possible misfire is detected, the methodology enters block 164 and clears the cylinder (n-2) flag. The methodology then advances to block 166 and calls the subroutine CONFRM which is a shared routine with POSMIS. The CONFRM subroutine will operate in the same manner as the POSMIS subroutine described early. The CONFRM subroutine thus will return a code to the main methodology indicating if combustion was detected. From block 166, the methodology advances to decision block 168 and determines if cylinder (n-2) really did misfire. If so, the methodology will pass to block 170 because this indicates that a misfire has occurred. In block 170, the methodology prepares to pass the value of cylinder (n-2) to indicate a misfire. The methodology then advances to block 172 and records a misfire for cylinder (n-2). The methodology then falls to block 174.

Figure 10:
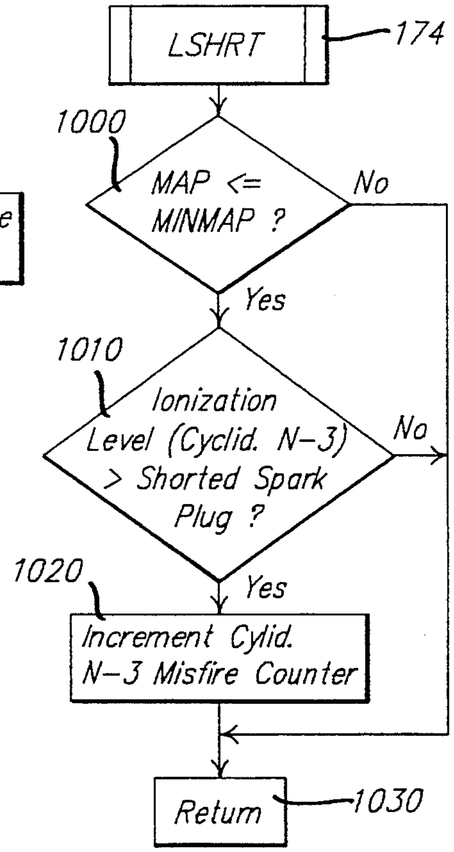

Upon entering block 174, the structure pointer is reset and the low MAP shorted spark plug test (LSHRT) is executed. As illustrated in FIG. 10, the subroutine LSHRT begins in decision block 1000 where cylinder (n-3) is tested for a shorted spark plug. This is done by determining if MAP is less than or equal to MINMAP. MINMAP is a calibration term which is found in the memory. In decision block 1000, if MAP is greater than MINMAP, the methodology falls to block 1030 and returns to the main methodology in FIG. 9. If MAP is less than or equal to MINMAP, the methodology advances to decision block 1010 and determines if any excess ionization current is present within cylinder (n-3) because this indicates that the spark plug is shorted which will indicate a misfire. If excessive ionization current is present within cylinder (n-3), the methodology advances to block 1020 and increments the cylinder (n-3) misfire counter. The methodology will then enter block 1030 and returns to the main methodology. In block 1010, if no excess ionization current was detected, then a misfire did not occur and the methodology will pass to block 1030 to return to the main methodology. After returning from the subroutine LSHRT, the methodology advances to block 176 and returns.

Referring to FIG. 8, in decision block 180, the methodology determines if 200 engine revolutions have been completed. This is done by testing the 200 revolution service flag to see if it is set from the IC1 interrupt service routine in FIG. 7. If 200 engine revolutions have been completed, the methodology enters block 182 and executes the RV200 service routine illustrated in FIG. 13.

Figure 13:
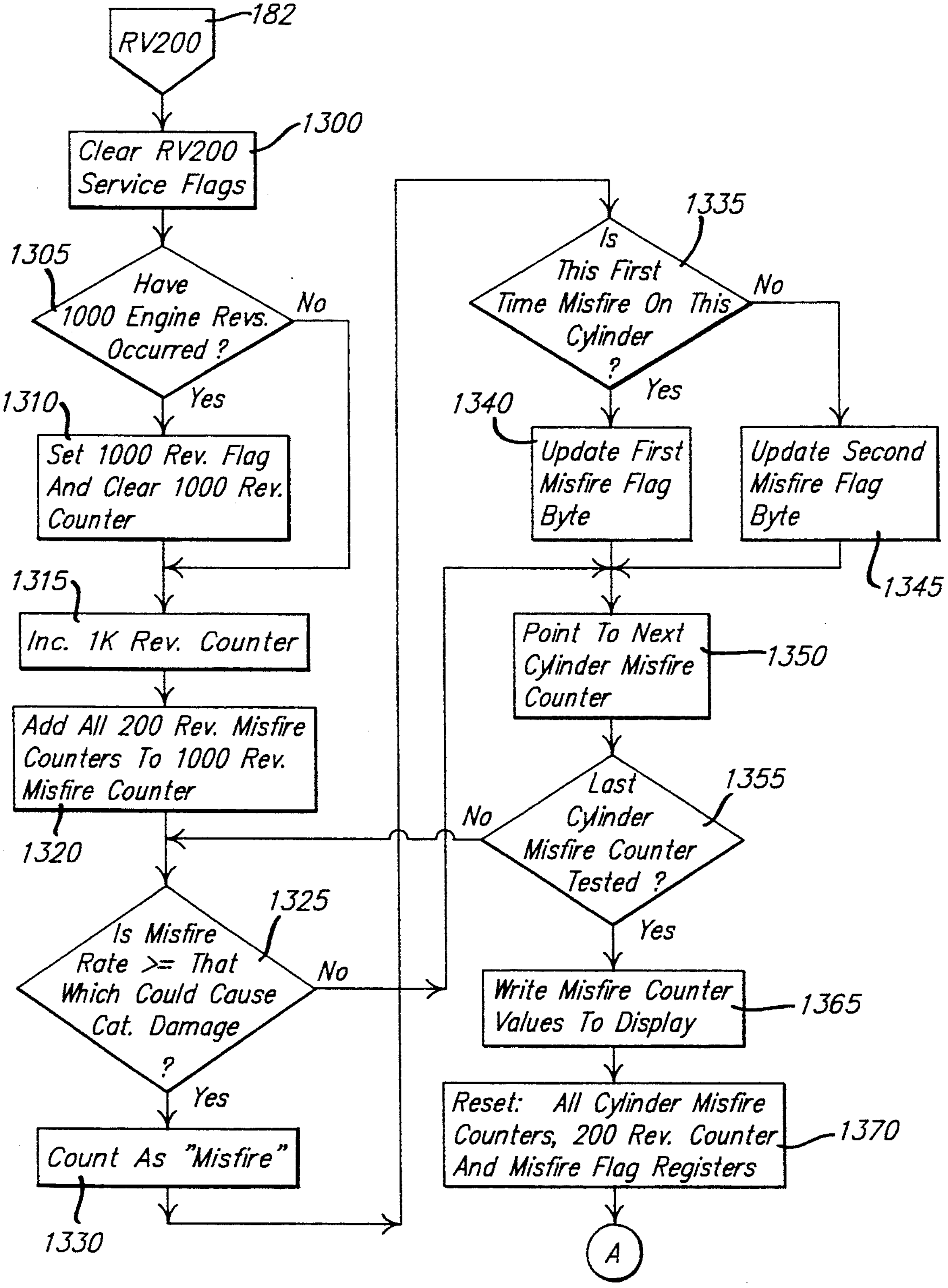

Referring to FIG. 13, the methodology enters block 1300 and clears the RV200 service flags. The methodology then advances to decision block 1305 and determines if 1000 engine revolutions have occurred. This is done by testing the 1000 revolution service counter to see if it has attained a value of five (5) which indicates that 1000 engine revolutions have occurred. If 1000 engine revolutions have occurred, the methodology enters block 1310 and sets the 1000 engine revolution flag and at the same time clears the 1000 engine revolution counter. In decision block 1305, if 1000 engine revolutions have not occurred, the methodology falls to block 1315.

In block 1315, the methodology increments the 1000 engine revolution counter. The methodology then enters block 1320 and adds all of the individual misfire counters together to the 1000 revolution misfire counter. This includes all misfire counters from the two hundred engine revolution and one thousand engine revolution service routines. The methodology then advances to decision block 1325 and determines if the misfire rate is great enough to cause catalytic damage. If not, the methodology advances to block 1350 to be described. If so, the methodology enters block 1330 and increments the misfire counter or counts as "misfire". The methodology then advances to decision block 1335 and determines if the detected misfire was the first misfire on this particular cylinder. This is done by testing to see if the counter had been zero previously, and if it was this would indicate the first detected misfire. If this was the first misfire on this particular cylinder, the methodology advances to block 1340 and updates the first misfire flag byte. However, if this was not the first misfire on this particular cylinder, the methodology advances to block 1345 and updates the second misfire flag byte with the second misfiring cylinder's identification.

Figure 14:
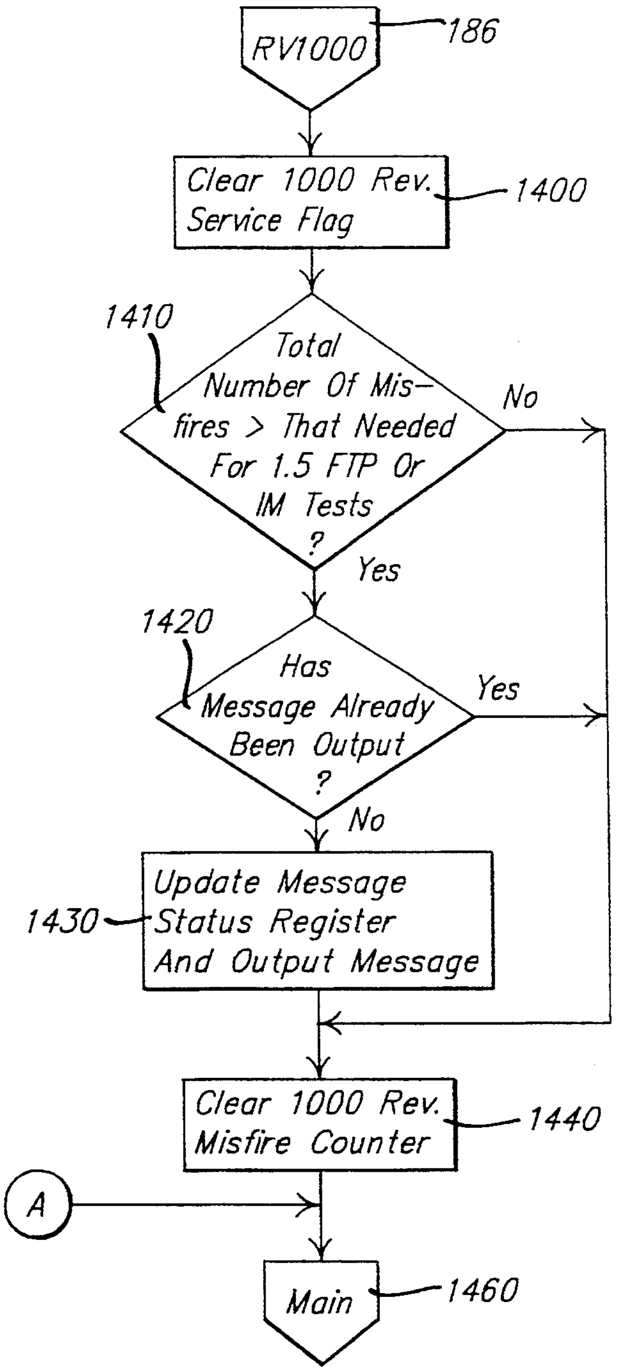

From blocks 1340 and 1345, the methodology advances to block 1350 and points to the next cylinder misfire counter in order to ensure that all misfires are sent to a message routine not described. Next, the methodology advances to decision block 1355 and determines if the last cylinder's misfire counter was tested. This will ensure that all misfires are sent to the message routine for proper display to the user. If the last cylinder misfire counter has not been tested, the methodology returns to decision block 1325 previously described. If it is found that the last cylinder misfire counter has been tested, the methodology advances to block 1365 and the misfire counter values are written to the display. The methodology then advances to block 1370 and resets all of the cylinder misfire counters, the two revolution counter, and the misfire flag registers. The methodology then advances to block 1460 in FIG. 14 and returns to the beginning of the main methodology.

Referring again to FIG. 8, in decision block 180, if 200 engine revolutions have not been completed, the methodology advances to decision block 184 and determines if one thousand (1000) engine revolutions have been completed. This is accomplished by checking to see if the 1000 revolution service flag is set. If 1000 engine revolutions have not been completed, the methodology advances to block 188 and reads input switches and set display intensity for messages. The methodology then returns through block 141. In decision block 184, if 1000 engine revolutions have occurred, the methodology advances to block 186 where the RV1000 service routine is executed in FIG. 14.

Upon entering the RV1000 service routine, the methodology begins in block 1400 and clears the 1000 engine revolution service flag. The methodology then advances to decision block 1410 and determines if the total number of individual cylinder misfires are greater than the number needed to fail the federal emissions test procedure (FTP) by a factor of 1.5 or fail the inspection maintenance test (IM) previously described. If the total number of misfires is not greater than the FTP or IM, the methodology advances to block 1440 to be described. If the total number of misfires is greater, the methodology advances to decision block 1420 and determines if the message has already been outputted. If so, the methodology advances to block 1440 to be described. If not, the methodology advances to block 1430 and updates the message status register and the output message. The methodology then advances to block 1440 and clears the 1000 revolution misfire counter. The methodology then enters block 1460 and returns to the main methodology.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of detecting misfire in cylinders of an internal combustion engine in a vehicle, said method comprising the steps of:

synchronizing combustion ionization measurements to an engine synchronous cylinder;

making combustion ionization measurements;

determining if misfire has occurred based on the combustion ionization measurements;

testing for catalyst damage and for at least one failed predetermined test requirement due to misfire occurring; and signaling a vehicle operator if a fault has occurred as a result of the testing.

2. A method as set forth in claim 1 including the step of initializing predetermined variables prior to said step of determining.

3. A method as set forth in claim 1 wherein said step of determining includes determining if ionization data is ready to be processed.

4. A method of detecting misfire in cylinders of an internal combustion engine in a vehicle, said method comprising the steps of:

determining if the engine is in synchronization for performing combustion ionization measurements;

making combustion ionization measurements if the engine is in synchronization for performing combustion ionization measurements;

determining if misfire has occurred based on the combustion ionization measurements;

testing for catalyst damage and for at least one failed predetermined test requirement if misfire has occurred; and signaling a vehicle operator if a fault has occurred as a result of the testing.

5. A method as set forth in claim 4 wherein said step of making comprises reading an ionization value for cylinders.

6. A method of detecting misfire in cylinders of an internal combustion engine in a vehicle, said method comprising the steps of:

synchronizing combustion ionization measurements to engine position;

reading combustion ionization data;

determining if the ionization data is ready to be processed and determining whether predetermined conditions have been met if the ionization data is ready to be processed;

determining if misfire has occurred based on the ionization data if the predetermined conditions have been met;

testing for catalyst damage and for at least one failed predetermined test requirement if misfire has occurred; and signaling a vehicle operator if a fault has occurred as a result of the testing.

7. A method as set forth in claim 6 including the step of determining if 200 engine revolutions have been completed or if 1000 engine revolutions have been completed if the ionization data is not ready to be processed.

8. A method as set forth in claims 6 including the step of calculating engine RPM prior to said determining whether predetermined conditions have been met.

9. A method of detecting misfire in cylinders of an internal combustion engine in a vehicle, said method comprising the steps of:

synchronizing combustion ionization measurements to engine position;

reading combustion ionization data;

determining if the ionization data is ready to be processed, determining whether predetermined conditions have been met if the ionization data is ready to be processed, and determining a current load factor on the engine if the predetermined conditions have been met;

determining if misfire has occurred based on the ionization data;

testing for catalyst damage and for at least one failed predetermined test requirement if misfire has occurred; and signaling a vehicle operator if a fault has occurred as a result of the testing.

10. A method as set forth in claim 9 wherein said step of determining the current load factor on the engine comprises finding a shorted spark plug ionization threshold and finding a minimum ionization for combustion threshold.

11. A method as set forth in claim 10 wherein said step of determining the current load factor on the engine further comprises calculating a cylinder identification and then proceeding to a corresponding cylinder service routine.

12. A method as set forth in claim 11 including the step of calculating a drift term whereby minor parallel d.c. current or circuit drift are compensated for after said step of proceeding.

13. A method as set forth in claim 12 wherein said step of determining if misfire has occurred comprises evaluating a predetermined cylinder for a possible misfire.

14. A method as set forth in claim 13 wherein said step of determining if misfire has occurred further comprises determining whether a combustion was detected based on evaluation of predetermined cylinders.

15. A method of detecting misfire in cylinders of an internal combustion engine in a vehicle, said method comprising the steps of:

synchronizing combustion ionization measurements to engine position;

reading combustion ionization data;

determining if the combustion ionization data is ready to be processed, determining whether predetermined conditions have been met if the combustion ionization data is ready to be processed, and determining a current load factor on the engine if the predetermined conditions have been met;

finding a shorted spark plug ionization threshold and finding a minimum ionization for combustion threshold;

calculating a cylinder identification and then proceeding to a corresponding cylinder service routine;

calculating a drift term whereby minor parallel d.c. current or circuit drift are compensated for;

evaluating a predetermined cylinder for a possible misfire;

testing for catalyst damage and for at least one failed predetermined test requirement if misfire has occurred; and signaling a vehicle operator if a fault has occurred as a result of the testing.

* * * * *